(12) United States Patent
Ishii

(10) Patent No.: US 8,708,173 B2
(45) Date of Patent: Apr. 29, 2014

(54) MOVING BODY SEPARATING DEVICE

(75) Inventor: Hiroaki Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 13/004,993

(22) Filed: Jan. 12, 2011

(65) Prior Publication Data

US 2011/0179615 A1  Jul. 28, 2011

(30) Foreign Application Priority Data

Jan. 26, 2010  (JP) .................................. 2010-014461

(51) Int. Cl.
*B61G 7/04* (2006.01)
*B61G 1/42* (2006.01)

(52) U.S. Cl.
USPC ...................................... 213/211; 213/75 A

(58) Field of Classification Search
CPC ............. B61G 1/42; B61G 1/40; B61G 7/04; B60D 1/04
USPC ............. 213/211, 75 A, 159, 75 R, 75 D, 77; 29/244, 281.6; 198/867.01, 463.1, 198/465.2; 118/324
See application file for complete search history.

(56) References Cited

U.S. PATENT DOCUMENTS 2,318,741 A * 5/1943 Bowen et al. .................. 213/211
2,617,541 A * 11/1952 Goode ........................... 213/211
3,134,489 A * 5/1964 Gillham ......................... 213/211
3,476,264 A * 11/1969 Nielsen ......................... 213/75 D
3,659,725 A * 5/1972 Passalacqua ............... 213/75 TC
4,228,907 A * 10/1980 Werner ....................... 213/75 TC
4,700,855 A * 10/1987 Boeniger ................... 213/75 TC
5,350,077 A * 9/1994 Nezu et al. .................. 213/75 R
5,503,280 A * 4/1996 Hanano et al. .................. 213/77
5,509,547 A * 4/1996 Gaertner ..................... 213/75 R
5,547,090 A * 8/1996 Richter ....................... 213/75 A

FOREIGN PATENT DOCUMENTS

JP  7-32166 A  6/1995
JP  10-24839 A  1/1998

* cited by examiner

*Primary Examiner* — Mark Le
(74) *Attorney, Agent, or Firm* — Sughrue Mion, PLLC

(57) ABSTRACT

The moving body separating device includes a separating device main body, which separates an upstream-side moving body disposed on a base plate to be movable in a straight-line direction and a downstream-side moving body connected to the upstream-side moving body on the base plate at a prescribed separating point when moving to a downstream side. The separating device main body includes a rotary body for pushing out the downstream-side moving body towards the downstream side through a rotary action, a supporting shaft held by the upstream-side moving body for supporting the rotary body to be freely rotatable, and an original-position returning spring held by the supporting shaft for returning the rotary body to an original position. A protrusion member which applies a rotary pressure force to the rotary body is fixed at a prescribed separating point on the base plate by corresponding to one end part of the rotary body.

7 Claims, 18 Drawing Sheets

MOVING BODY SEPARATING DEVICE

CROSS-REFERENCE TO RELATED APPLICATION

This application is based upon and claims the benefit of priority from Japanese patent application No. 2010-014461, filed on Jan. 26, 2010, the disclosure of which is incorporated herein in its entirety by reference.

BACKGROUND OF THE INVENTION

1. Field of the Invention

The present invention relates to a moving body separating device and, more specifically, to a moving body separating device which mutually separates moving bodies connected in series on an upstream side and a downstream side at a prescribed separating position.

2. Description of the Related Art

Conventionally, as a device which mutually separates moving bodies connected in series at a prescribed position, there is known an automatic tow device of a carrying truck which runs by having a tow truck connected to a self-running carrying truck, separates the tow truck at an arbitrary position, and further tows a new tow truck at another position (see Japanese Examined Utility Model Publication Hei 7-32166 (Patent Document 1), for example). The automatic tow device of the carrying truck disclosed in Patent Document 1 is structured to have a traction metal fitting of the carrying truck collided with a collision member of a stand placed at a prescribed position to release the traction metal fitting from a connecting rod of the tow truck.

Further, there is also known a separation control device of an automated carrying truck and a loading truck running on a path, which separates the automated carrying truck and the loading truck while keeping them running (see Japanese Unexamined Patent Publication Hei 10-24839 (Patent Document 2), for example).

With the automated carrying truck and the loading truck separation control device disclosed in Patent Document 2, separation of a separation unit provided to the automated carrying truck and a connection pin provided to the loading truck is done through controlling a connection separating controller.

Further, other than the separating devices of Patent Document 1 and Patent Document 2 described above, generally executed for separating a moving body on an upstream side and a moving body on a downstream side, which are mutually connected and moving in a straight-line direction, is as follows. That is, the moving body on the upstream side is fixed intentionally and an external force is applied to the moving body on the downstream side to have them separated, and fixation of the moving body on the upstream side is intentionally released to take out the moving body on the upstream side.

However, while the device disclosed in Patent Document 1 described above is structured to separate the carrying truck by colliding the traction metal fitting of the carrying truck with the collision member of the stand, there is a risk of not being able to have them collided since the collision member is located on the side of the traction metal fitting. Thus, it is not necessarily assured that separation can be done securely.

Further, while the device disclosed in Patent Document 2 described above is structured to execute separation at a prescribed position, to detect the position of the separation of the separation unit and the connecting pin by a sensor, and to control the connecting separation controller, there is a possibility of having malfunctions. Thus, it is not necessarily assured that separation can be done securely in this case, either.

Furthermore, with the separation method conducted in general, there are following issues to be solved. That is, operations thereof are such troublesome works that it is necessary to provide another device for fixing the moving body on the upper stream, and that it is necessary to conduct fixing and releasing operations thereof as well as an operation for releasing the connection of the both bodies.

It is therefore an exemplary object of the present invention to provide a moving body separating device which can securely separate connected moving bodies with a simple operation.

SUMMARY OF THE INVENTION

The moving body separating device according to an exemplary aspect of the invention is characterized to include a separating device main body loaded on an upstream-side moving body disposed to be movable in one direction on a base to function to separate a downstream-side moving body connected to the upstream-side moving body on the base at a prescribed separating point when moving to a downstream side, wherein: the separating device main body includes a rotary pressure member disposed close to the downstream-side moving body to function to push out the downstream-side moving body towards the downstream side by its other end part through a rotary action, a supporting shaft held by the upstream-side moving body for supporting the rotary pressure member to be freely rotatable, and an original-position returning spring held by the supporting shaft for returning the rotary pressure member to an original position; and a pressure force energizing member which generates a rotary pressure force at the rotary pressure member by energizing the rotary pressure member is fixed at the separating point on the base by corresponding to one end part of the rotary pressure member.

BRIEF DESCRIPTION OF THE DRAWINGS

FIGS. 3A and 3B show a connecting module for connecting the upstream-side moving body and the downstream-side moving body of the exemplary embodiment, in which FIG. 3A is a side view showing a state before connecting a first connecting member and a second connecting member and FIG. 3B is a side view showing a state where the first connecting member and the second connecting member are being connected;

DETAILED DESCRIPTION OF THE PREFERRED EMBODIMENTS

Hereinafter, an exemplary embodiment of a moving body separating device according to the present invention will be described by referring to the accompanying drawings.

Figure 1:
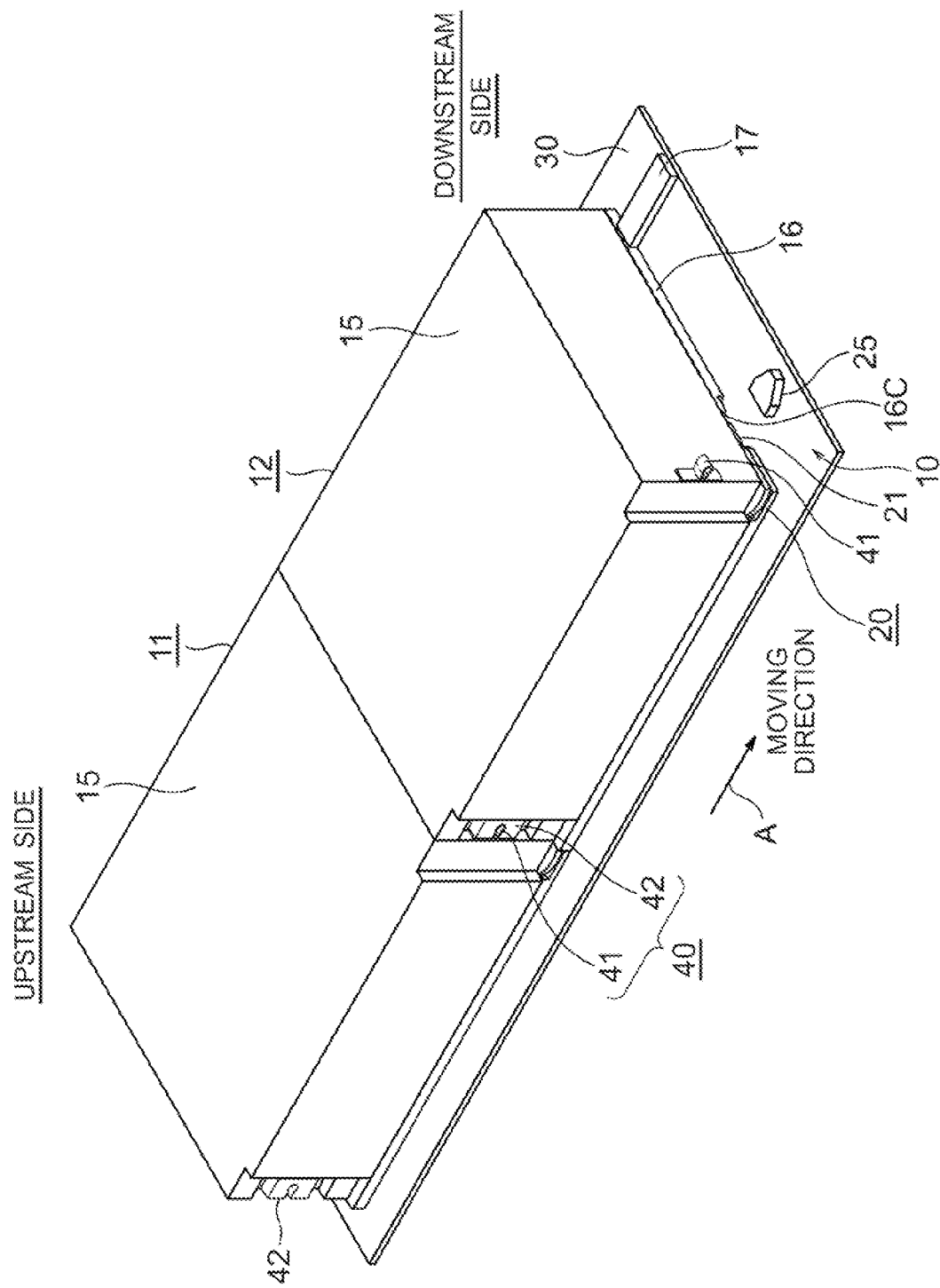
FIG 1 is an overall perspective view showing a state where an upstream-side moving body to which a moving body separating device according to an exemplary embodiment is loaded and a downstream-side moving body connected thereto are placed on a base plate.

FIG. 1 is an overall illustration showing a layout in which an upstream-side moving body 11 and a downstream-side moving body 12, each including a moving body separating device 10 of the exemplary embodiment and being coupled to each other, are placed on a base plate. The moving body separating device 10 according to the exemplary embodiment is loaded to each of the upstream-side moving body 11 disposed to be capable of moving in one straight-line direction shown by an arrow A on the base plate 30 as a base and the downstream-side moving body 12 connected to the upstream-side moving body 11 on the base plate 20, and it is structured by including a separating device main body 20 which functions to separate the downstream-side moving body 12 from the upstream-side moving body 11 at a prescribed separating point when the both moving bodies 11 and 12 move towards the downstream-side.

Figure 5:
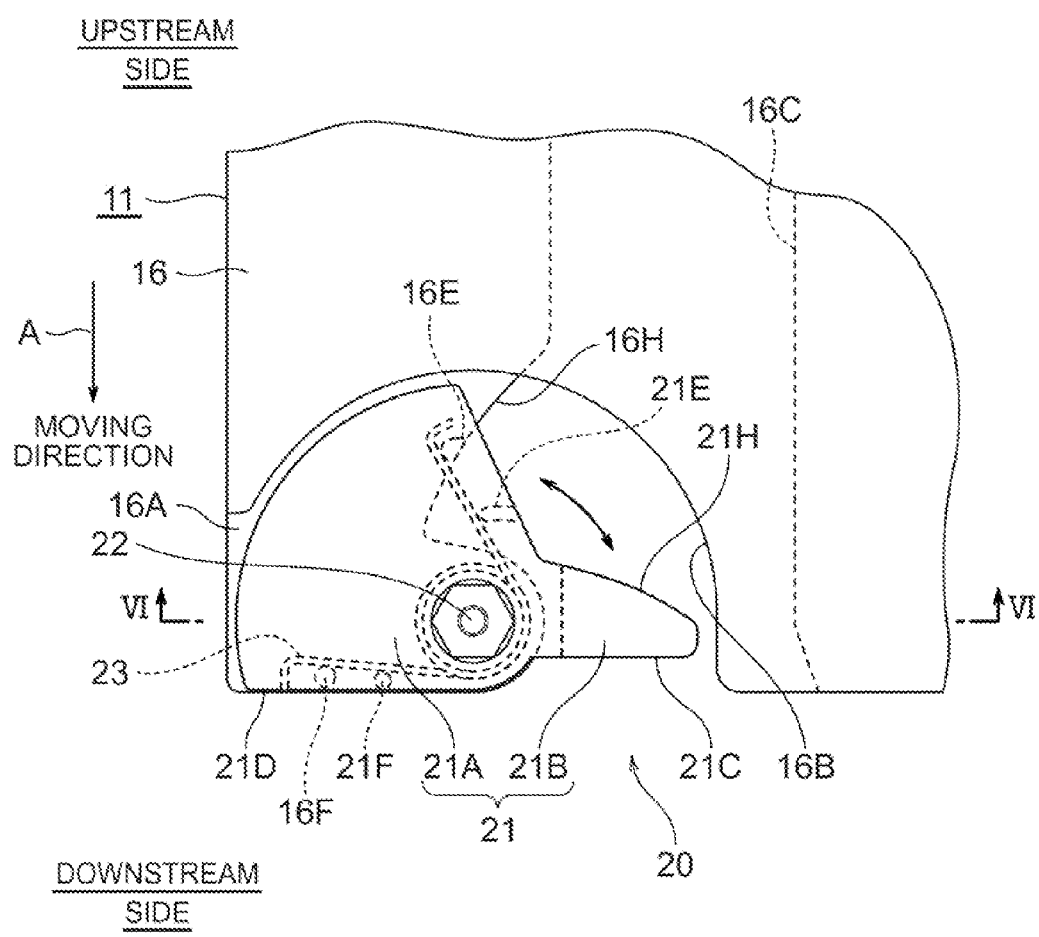
FIG. 5 is an enlarged plan view showing the details of the rotary pressure member of the upstream-side moving body according to the exemplary embodiment.

The separating device main body 20 in the upstream-side moving body 11 is disposed on the front face part of the upstream-side moving body 11 in the moving direction, i.e., disposed close to the downstream-side moving body 12. As shown in FIG. 5 in details, the separating device main body 20 of the upstream-side moving body 11 is structured by including: a rotary body 21 that is a rotary pressure member which functions to push the downstream-side moving body 12 towards the downstream-side by its flat part 21A configuring the other end by a rotary action; a supporting shaft 22 which supports the rotary body 21 to be freely rotatable; and a twist coil spring 23 as an original-position returning spring for returning the rotary body 21 to the original position by being supported by the supporting shaft 22.

Further, a protrusion member 25 (see FIG. 1) which is a pressure force energizing member for applying a rotary pressure force to the rotary body 21 is fixed at a prescribed separating point on the base plate 30 by corresponding to a rotary engaging part 21B (see FIG. 5 and the like) which forms one end of the rotary body 21. This prescribed separating part, i.e., the position of the protrusion member 25, is the separating position of the upstream-side moving body 11 and the downstream-side moving body 12.

Note here that in a case where each of the moving bodies 11, 12 are disposed in a state shown in FIG. 1, the downstream-side moving body 12 is separated, and then a new moving body is connected to a rear end part of the upstream-side moving body 11, the upstream-side moving body 11 turns out to be the downstream-side moving body 12 and the new moving body turns out to be the upstream-side moving body.

While the reference numerals of the moving bodies 11 and 12 are different from each other, the separating device 10 of the same structure is loaded on to both bodies as described above. Thus, it is to be understood that the explanations of FIG. 2 to FIG. 17 shown below are presented by concentrating on the upstream-side moving body 11 out of the connected upstream-side and downstream-side moving bodies 11, 12.

Figure 2:
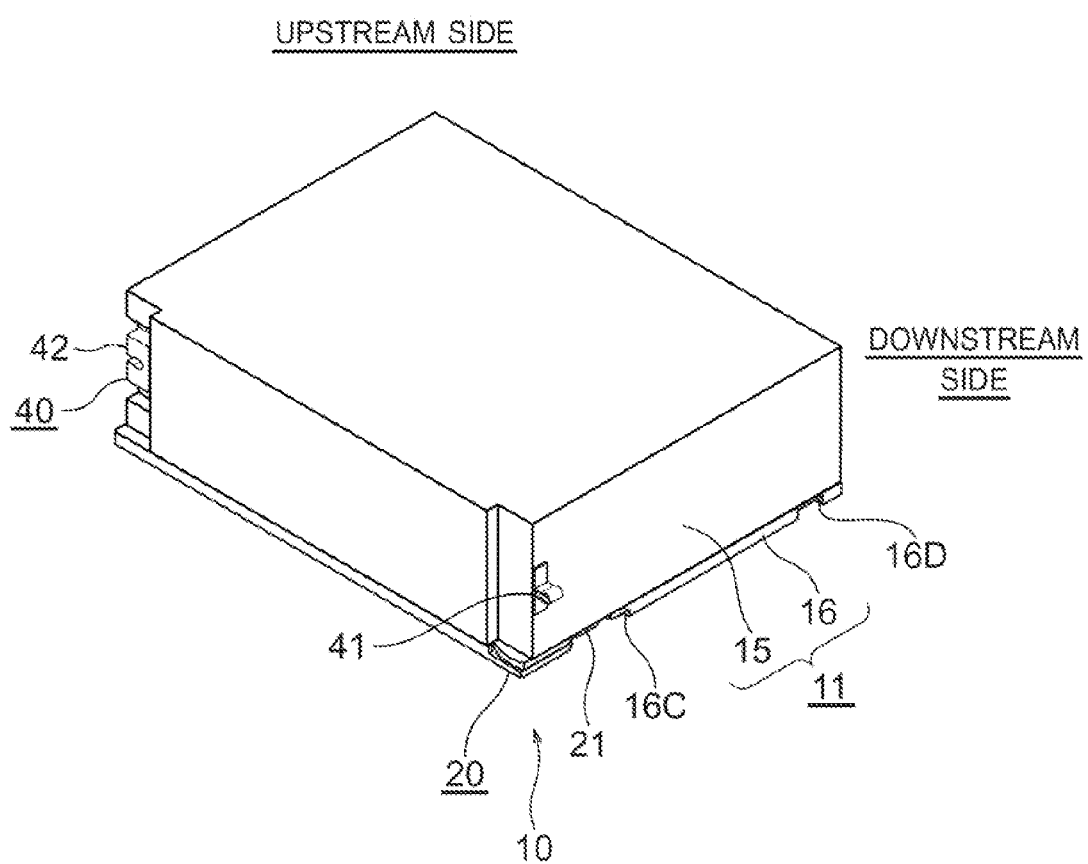
FIG. 2 is an overall perspective view showing the upstream-side moving body of the exemplary embodiment.

As shown in FIG. 2, the upstream-side moving body 11 is structured by including a main body part 15 and a bottom plate part 16. The main body part 15 is formed in a cuboid shape as a whole, and the longitudinal direction thereof is arranged along the direction from the upstream-side towards the downstream-side.

A connecting module 40 for connecting each of the moving bodies 11 and 12 is provided in an end part on one side of the width direction on front and rear end faces of the moving direction of the main body part 15.

The connecting module 40 is configured with a first connecting member 41 provided in downstream-sides of each of the moving bodies 11, 12, i.e., provided in the front end parts of the moving direction, and a second connecting member 42 provided in upstream-sides thereof, i.e., provided in the rear end parts of the moving direction.

Figure 3A:
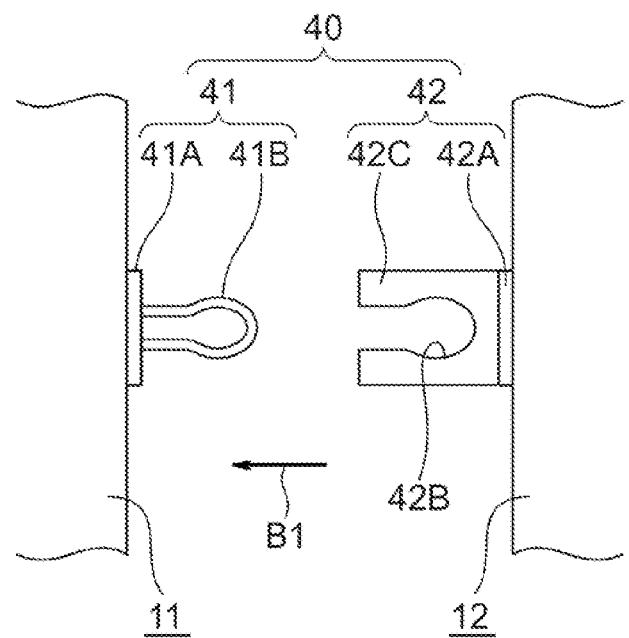
Figure 3B:
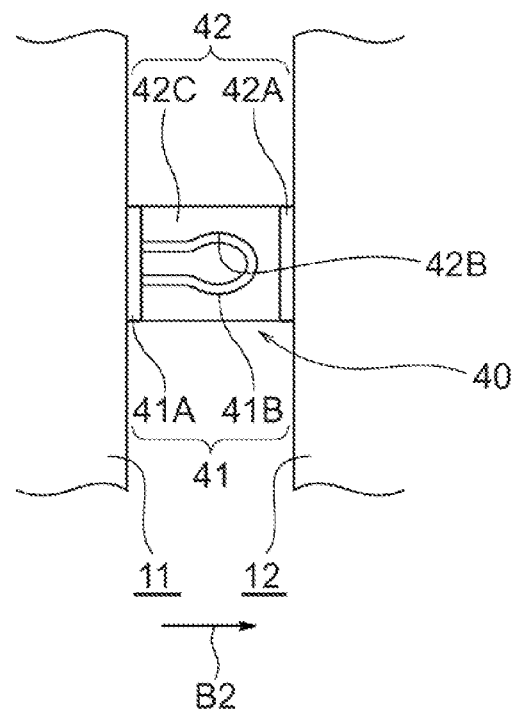
Figure 4:
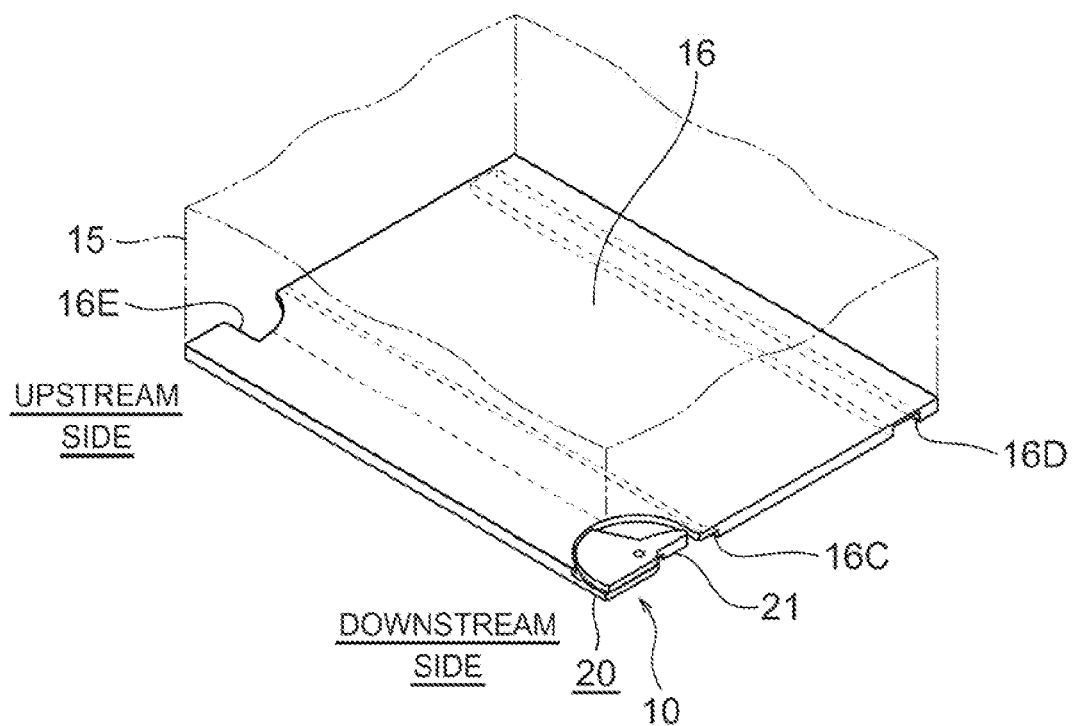
FIG. 4 is a perspective view showing a bottom plate part of the upstream-side moving body to which a rotary pressure member of the exemplary embodiment is loaded.

Each of the connecting members 41 and 42 is in a structure as shown in FIG. 3A and FIG. 3B. That is, the first connecting member 41 is structured by including an attaching plate 41A and a spring-made protrusion part 41B fixed to the attaching plate 42A. The spring-made protrusion part 41B is formed by working on a spring member to make it in a key hole shape sectionally.

In the meantime, the second connecting member 42 is structured by including an attaching plate 42A and a receptacle part 42C fixed to the attaching plate 42A. A recessed part 42B corresponding to the spring-made protrusion part 41B is formed inside the receptacle part 42C.

Thereby, when the second connecting member 42 is moved in the direction of an arrow B1 from the state of FIG. 3A to be engaged, for example, the spring-made protrusion part 41B and the recessed part 42B are engaged. Thus, as shown in FIG. 3B, the upstream-side and the downstream-side moving bodies 11 and 12 are connected.

Further, by fixing the downstream-side moving body 12 and applying a prescribed external force to the upstream-side moving body 11 in the direction of an arrow B2, the engagement of the spring-made protrusion part 41B and the recessed part 42B is released from the state of FIG. 3B. Thereby, the upstream-side moving body 11 and the downstream-side moving body 12 are separated to be in a state of FIG. 3A described above.

Further, the connecting strength of each of the connecting members 41, 42 is set to be in such an extent with which the connecting state is maintained until an arbitrary load is applied and the connecting state is released when a load of the arbitrary value is applied.

As shown in FIG. 1, the upstream-side moving body 11 and the downstream-side moving body 12 are movable in the moving direction shown with the arrow A, while the movements in the top-and-bottom direction and the lateral direction are restricted.

FIG. 4 to FIG. 9 show the details of a part of the bottom plate part 16 and the separating device main body 20.

Figure 6:
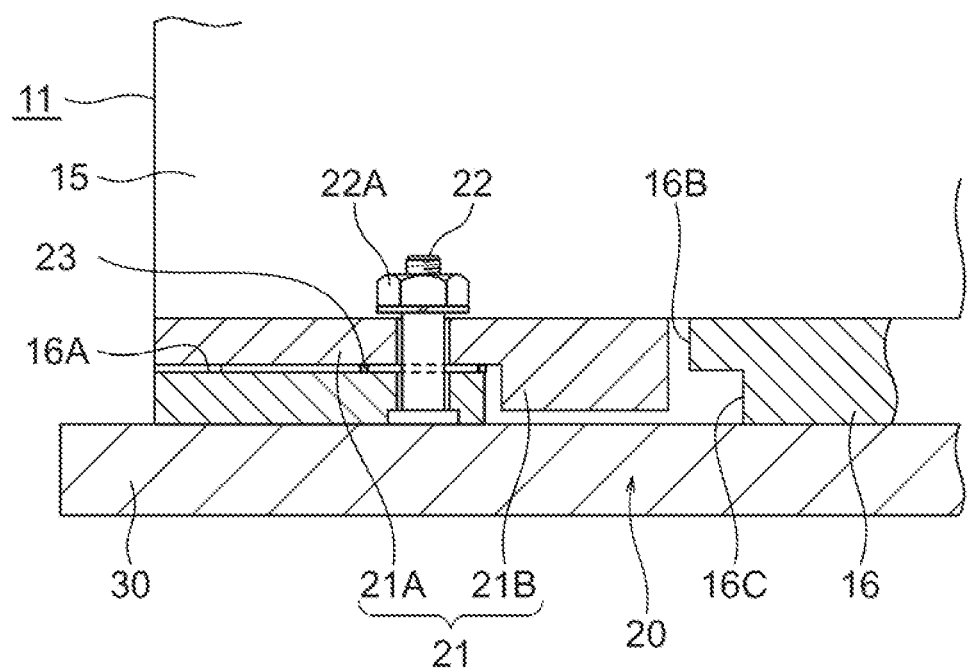
FIG. 6 is a longitudinal sectional view taken along a line VI-VI of FIG. 5.

As shown in FIG. 5 and the like in details, a notch part 16B that is substantially in a semi-circular shape on a plan view is formed in an end part on one side of the width direction of the front face part of the moving direction of the bottom plate part 16, and a part of the notch part 16B forms a step part 16A that is lower by one step from the top face of the bottom plate part 16. This step part 16A is formed in a thickness of about a half the thickness of the bottom plate part 16 as shown in FIG. 6.

The separating device main body 20 formed by including the rotary body 21 is housed inside the notch part 16B.

That is, as shown in FIG. 5 in details, the separating device main body 20 is structured by including the rotary body 21 that is rotatable within the notch part 16B by being supported by a supporting shaft 22, and the twist coil spring 23 which returns the rotary body 21 to the original position before that comes in contact with the protrusion member 25.

The rotary body 21 is formed with: a flat part 21A which is placed on the step part 16A and forms the fan-shaped other end part that is rotatable on a plane; and a rotary engaging part 21B which continues from the flat part 21A and configures the one end part extended from the flat part 21A in a bird's bill shape.

A front-side end face 21C of the rotary engaging part 21B is capable of being in contact with the protrusion member 25. Further, a front-side end face 21D of the rotary engaging part 21B of the rotary body 21 is capable of being in contact with the rear end face of the downstream-side moving body 12. Furthermore, as shown in FIG. 6, the thickness of the rotary engaging part 21B is thicker than the thickness of the flat part 21A, and a rear-side end face 21H of the rotary engaging part 21B is capable of being abutted against one side face 16H of the step part 16A (see FIG. 8).

The supporting shaft 22 is disposed in a boundary part between the flat part 21A and the rotary engaging part 21B, and fixed to the step part 16A.

That is, as in the details of the sectional view shown in FIG. 6, the supporting shaft 22 is formed by a bolt-like member. The external size of the screw part is formed smaller than the diameter of the shaft part, and the top end of the shaft part is set to be in a size to be slightly projected from the top face of the flat part 21A of the rotary body 21 that is loaded on the step part 16A.

Thus, when fastening a nut 22A, a small clearance is formed between the bottom face of the nut 22A and the top face of the flat part 21A of the rotary body 21. This allows the rotary body 21 to rotate easily.

Figure 7:
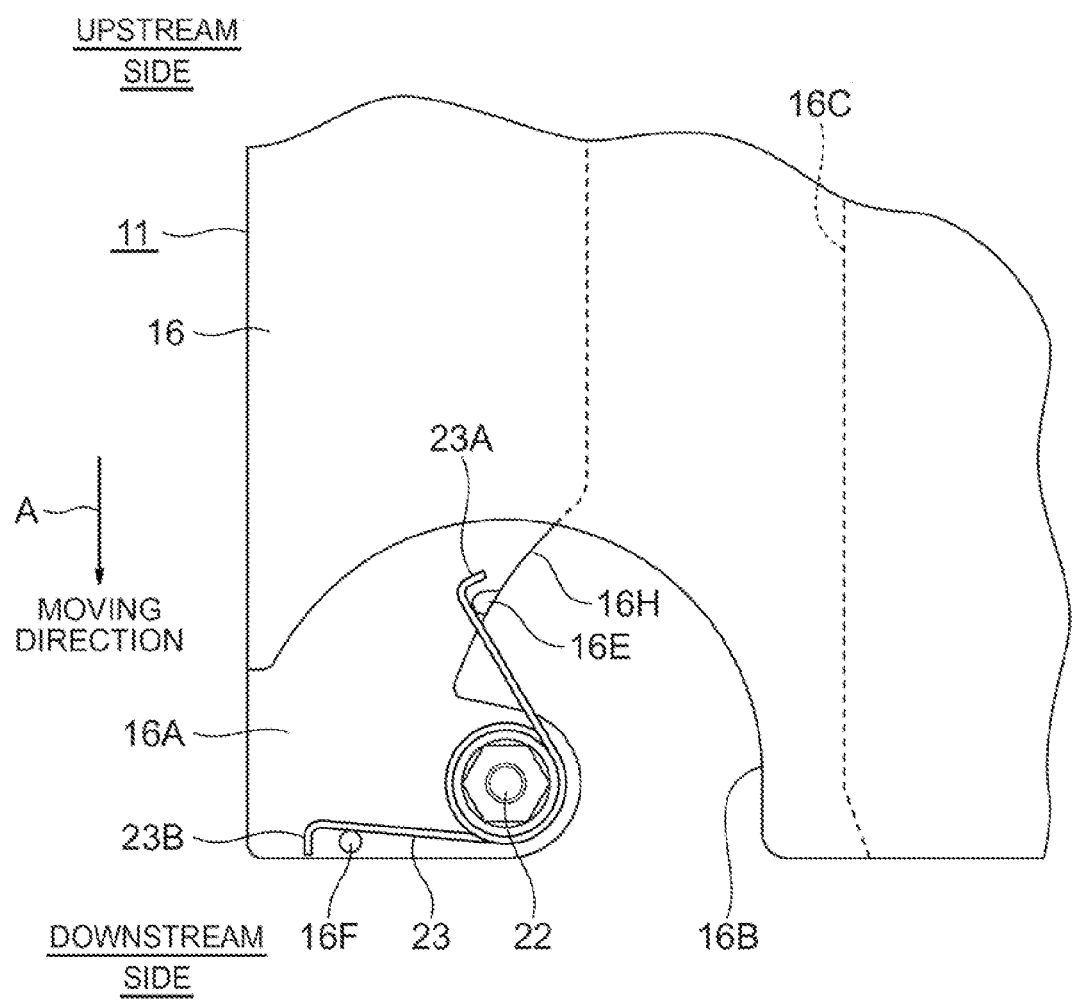
FIG. 7 is an enlarged plan view showing a relation between a step part of the bottom plate part of the upstream-side moving body and an original-position returning spring according to the exemplary embodiment.

The twist coil spring 23 is formed substantially in a V-letter shape, and is energized to its open direction as shown in FIG. 7 and the like. Further, the twist coil spring 23 is placed between the bottom face of the flat part 21A of the rotary body 21 and the top face of the step part 16A, and it is wound around the periphery of the supporting shaft 22.

One-end side hook part 23A and other-end side hook part 23B of the twist coil spring 23 are bent towards the outer side of the V-letter shape, respectively. Out of those, the one-end side hook part 23A is capable of being engaged with a protruded spring catch part 16E formed on the top face of the step part 16A, and the other-end side hook part 23B is capable of being engaged with a protruded spring catch part 16F formed on the top face of the step part 16A.

The spring catch part 16E and the spring catch part 16F are provided in a concentric manner by having the supporting shaft 22 as the center. Each of the spring catch parts 16E and 16F is in a size slightly larger than the diameter of the twist coil spring 23 and protruded on the top face of the step part 16A.

Further, the top end faces of the spring catch part 16E and the spring catch part 16F are in contact with the bottom face of the flat part 21A of the rotary body 21.

Returning to FIG. 4, a protrusion-member guide groove 16C as an energizing-member guide groove is formed over the whole length along the length direction of the bottom plate part 16 at a position neighboring to the notch part 16B in the width direction. The protrusion-member guide groove 16C is formed to guide the upstream-side moving body 11 to the protrusion member 25 when it moves.

In a part closer to the side end part of the bottom plate part 16 on the opposite side of the protrusion-member guide groove 16C in the width direction, a rail guide groove 46D corresponding to a rail 17 to be described later in details is formed over the whole length of the bottom plate part 16 in the length direction. Further, the protrusion-member guide groove 16C and the rail guide groove 16D are formed in parallel and in a straight-line form. On the opposite side of the separating device main body 20 in the longitudinal direction of the bottom plate part 16, a notch part 16E is formed for guiding the rotary body 21 of the upstream-side moving body 11 to rotate clockwise when the upstream-side moving body 11 and the downstream-side moving body 12 are coupled (see FIG. 9).

The rotary body 21 is rotatable substantially at 90 degrees in the counterclockwise direction and the clockwise direction, respectively, with respect to the supporting shaft 22 within the notch part 16B, and one-side face 16H is formed in a gradually curved shape.

Figure 8:
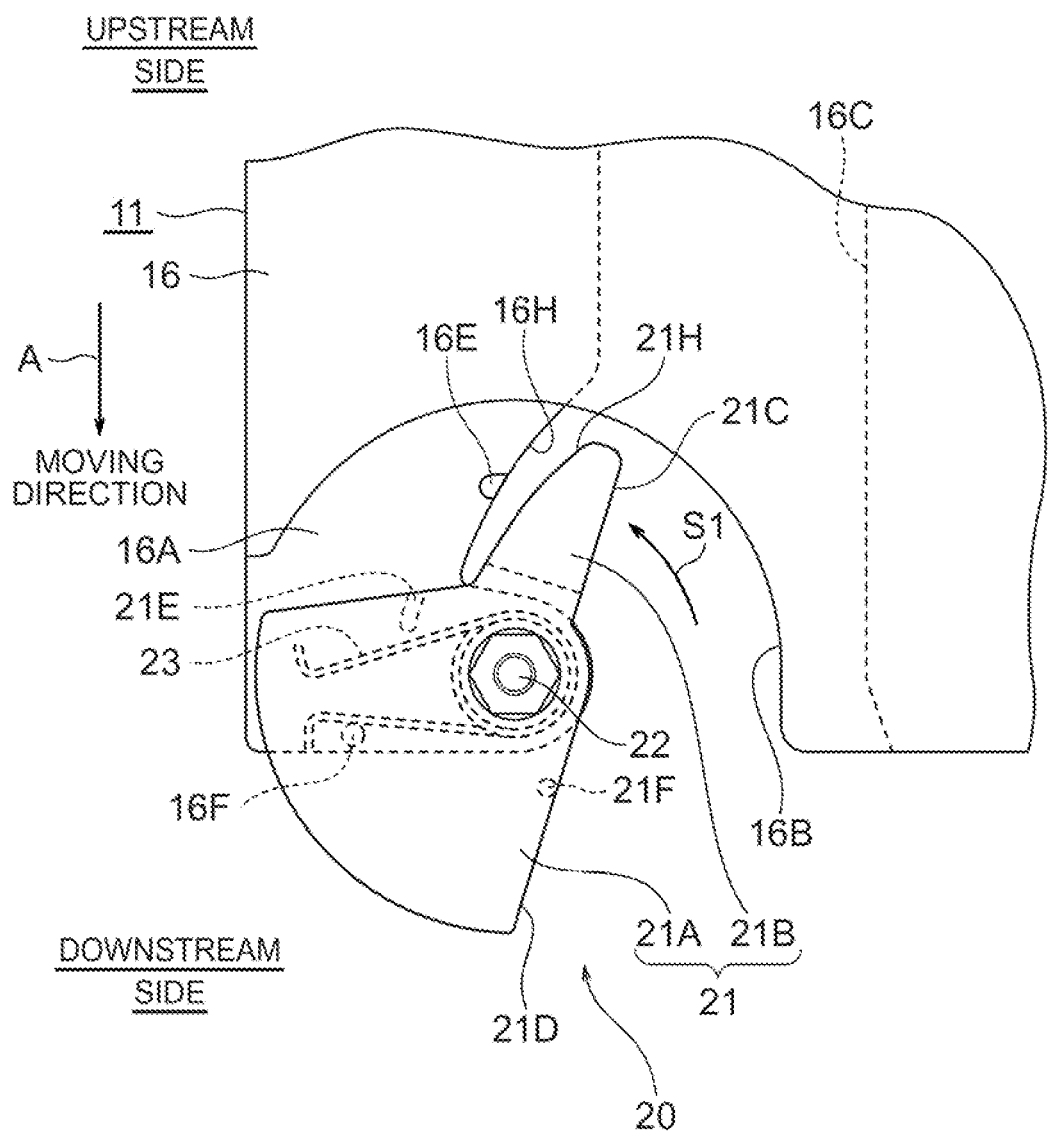
FIG. 8 is a plan view showing a state where the upstream-side moving body moves from the state of FIG. 5 and the rotary pressure member rotates counterclockwise in the greatest level.
Figure 9:
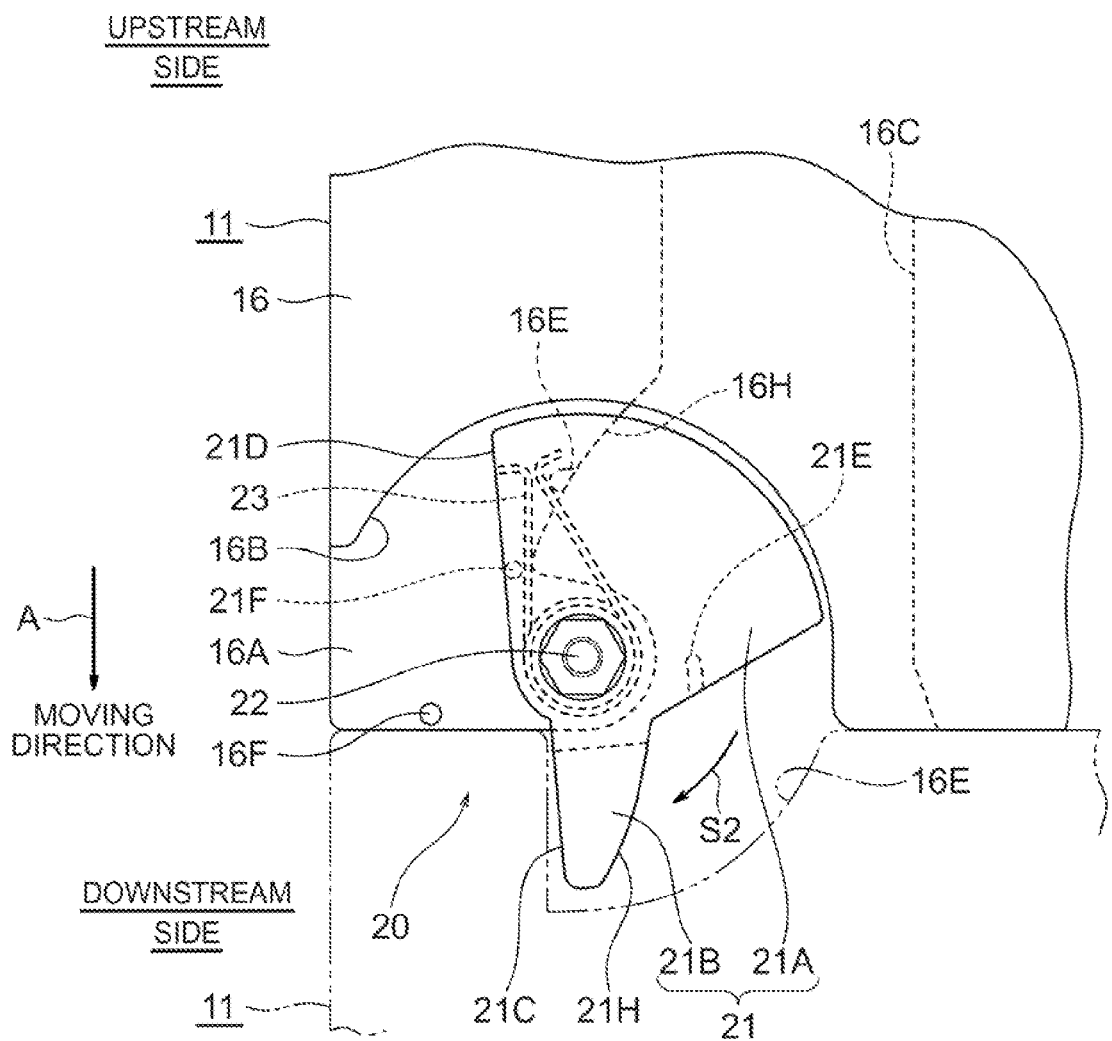
FIG. 9 is a plan view showing a state where the upstream-side moving body moves from the state of FIG. 5 and the rotary pressure member rotates clockwise in the greatest level.

That is, as shown in FIG. 8 and FIG. 9, the step part 16A is formed in substantially ¼ part of the semicircular notch part 16B at an angle close to 90 degrees, so that the rotary body 21 can rotate substantially at 90 degrees counterclockwise from the state of the original position shown in FIG. 5.

In the meantime, a rear-side end face 21H of the rotary engaging part 21B of the rotary body 21 is formed to abut against the one-side face 16H of the step part 16A, and the front-side end face 21C of the rotary engaging part 21B of the rotary body 21 is set to come to a position that is substantially at 90 degrees from the top end face of the bottom plate part 16 in the moving direction when the both of the rear-side end face 21H and the one-side face 16H abut against each other.

Further, the bottom face of the flat part 21A of the rotary body 21 opposes the top face of the step part 16A, and a protruded spring catch part 21E formed towards the step part 16A side and a protruded spring catch part 21F are provided on the bottom face.

The spring catch part 21E and the spring catch part 21F are formed substantially in the same protrusion size as that of the spring catch part 16E and the spring catch part 16F formed on the top face of the step part 16A, and the upper end faces of the spring catch part 21E and the spring catch part 21F are capable of being abutted against the top face of the step part 16A. The spring catch part 21E and the spring catch part 21F are provided in a concentric manner by having the supporting shaft 22 as the center. Further, each of the spring catch part 21E and the spring catch part 21F is projected from the bottom face of the flat part 21A in a size that is slightly larger than the diameter of the twist coil spring 23.

Thus, when the flat part 21A of the rotary engaging part 21B rotates with respect to the step part 16A, it is structured to rotate while the spring catch part 16E as well as the spring catch part 16F are abutted against the bottom face of the flat part 21A of the rotary body 21 and the spring catch part 21E as well as the spring catch part 21F are abutted against the top face of the step part 16A. Further, it is provided at a position so as not to interfere with the spring catch part 16E and the spring catch part 16F when the rotary body 21 rotates.

Furthermore, the twist coil spring 23 is disposed within a space in the vertical direction formed between the spring catch part 16E as well as the spring catch part 16F and the spring catch part 21E as well as the spring catch part 21F.

Since the rotary body 21 and the twist coil spring 23 are structured in the above-described manner with respect to the step part 16A, the rotary body 21 rotates in the direction of an arrow S1, i.e., in the counterclockwise direction, when a rotating pressure power from the protrusion member 25 (see FIG. 1) is applied to the rotary engaging part 21B of the rotary body 21 as shown in FIG. 8.

At this time, when the rotary body 21 rotates in a state where the other-end side hook part 23B is hooked to the spring catch part 16F, the twist coil spring 23 is compressed due to the rotation, i.e., the one-end side hook part 23A approaches the other-end side hook part 23B. When the rotary pressure force applied to the rotary engaging part 21B of the rotary body 21 is released from this state, the rotary body 21 rotates inversely from the above state, i.e., rotates in the clockwise direction to return to the original position shown in FIG. 5, due to the spring force of the twist coil spring 23.

Further, as shown in FIG. 9, the rotary body 21 is formed to be capable of rotating substantially at 90 degrees in the clockwise direction as well.

That is, when a pressure rotating force for rotating towards the clockwise direction is applied to the rotary body 21 that is being returned to the original position shown in FIG. 5 while the upstream-side moving body 11 and the lower-steam side moving body 12 are being connected, the upstream-side moving body 11 and the lower-steam side moving body 12 in a connected state can pass the protrusion member 25 in the direction inverted from the moving direction shown in the drawing.

At this time, the rotary engaging part 21B can rotate clockwise since the notch part 16E is formed on the moving-direction rear end face of the downstream-side moving body 12 as described above.

Further, in a state of FIG. 9, the twist coil spring 23 is compressed by being pressed by the spring catch part 16F, i.e., the other-end side hook part 23B approaches the one-end side hook part 23A, when the rotary body 21 rotates while the one-end side hook part 23A of the twist coil spring 23 is being hooked to the spring catch part 16E. Furthermore, when the twist coil spring 23 is compressed at the most, the rotary engaging part 21B of the rotary body 21 is rotated to a position that is substantially at 90 degrees from the moving-direction front end face of the upstream-side moving body 11.

Figure 10:
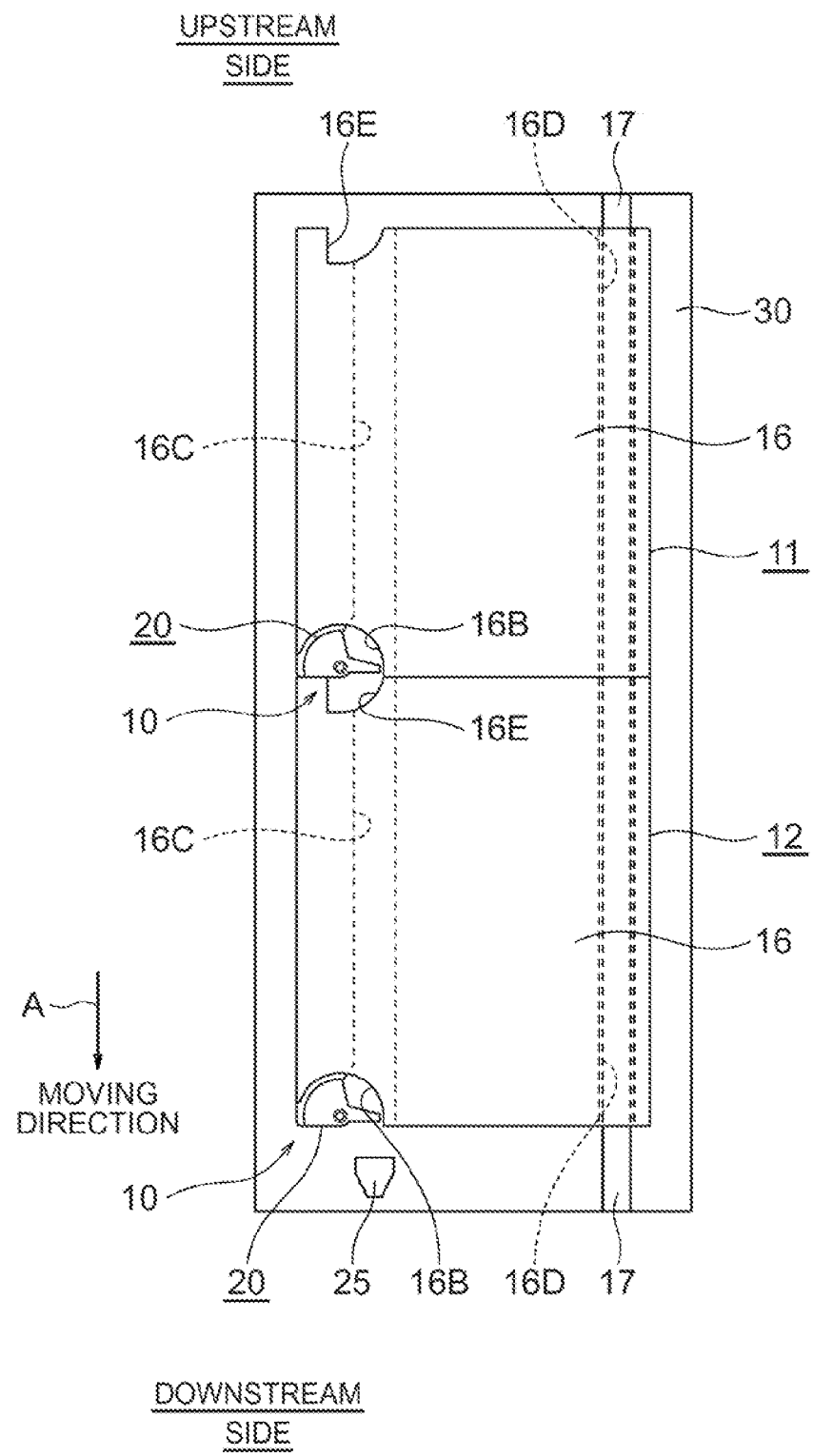
FIG. 10 is a plan view showing the bottom plate parts of the upstream-side and the downstream-side moving bodies placed on the base plate in the state of FIG. 1.

As shown in FIG. 10 and the like, the protrusion member 25 is provided on the moving-direction front end side and on the traveling direction of each of the moving bodies 11, 12, and it is formed in a shape of a home plate of baseball. Further, it is disposed in such a manner that one side opposing to the vertex side becomes in parallel to the moving-direction front end side of each of the moving bodies 11 and 12.

The guide groove 16C of the upstream-side moving body 11 and the downstream-side moving body 12 correspond to the protrusion member 25, so that each of the moving bodies 11, 12 can pass over the protrusion member 25.

Further, the rail 17 is disposed along the whole length of the base plate 30 in the length direction to guide on the rail guide groove 16D. That is, the upstream-side moving body 11 and the downstream-side moving body 12 are guided by the rail 17 to move along the moving direction.

Next, effects of the exemplary embodiment will be described by referring to FIG. 10 to FIG. 13.

FIG. 10 to FIG. 13 show plan views of the bottom plate part 16, the rail 17, and the protrusion member 25 of the upstream-side moving body 11 and the downstream-side moving body 12 loaded on the base plate 30.

When the downstream-side moving body 12 is pulled, for example, to move it in the moving direction shown by the arrow A from the state shown in FIG. 10 by applying an external force, the upstream-side moving body 11 moves along the downstream-side moving body 12 by being guided on the rail 17 since the upstream-side moving body 11 is connected to the downstream-side moving body 12 via the first and second connecting members 41 and 42 of the connecting member 40.

Figure 11:
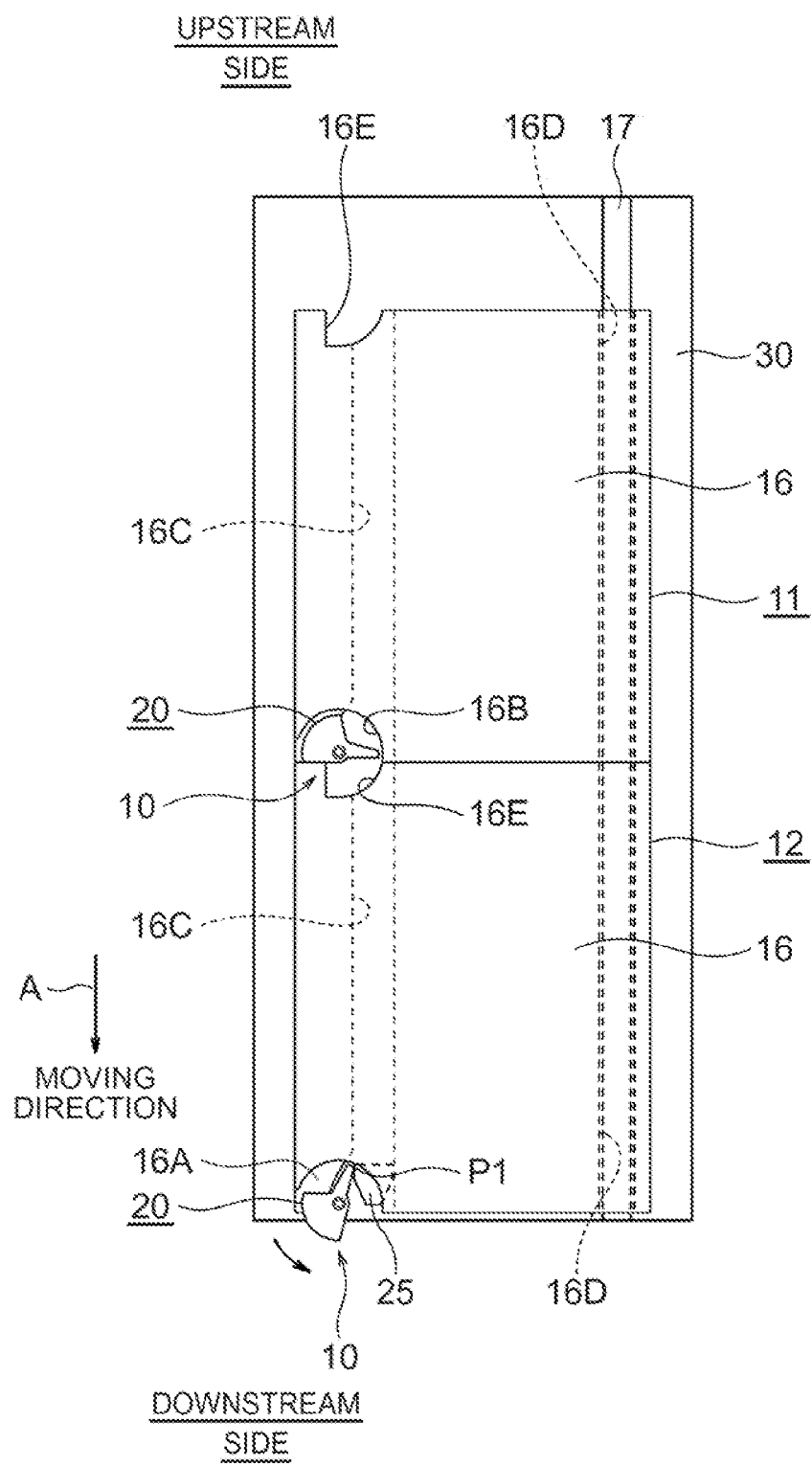
FIG. 11 is a plan view showing a state where the upstream-side moving body and the downstream-side moving body move on the base plate from the state of FIG. 10, and the rotary pressure member and a protrusion member of the downstream-side moving body come in contact.

When the downstream-side moving body 12 is moved further after the rotary body 21 of the separating device main body 20 of the downstream-side moving body 12 comes in contact with the protrusion member 25 by a movement of the upstream-side moving body 11 and the downstream-side moving body 12, the rotary body 21 rotates upon making contact with the protrusion member 25 as shown in FIG. 11.

Figure 16:
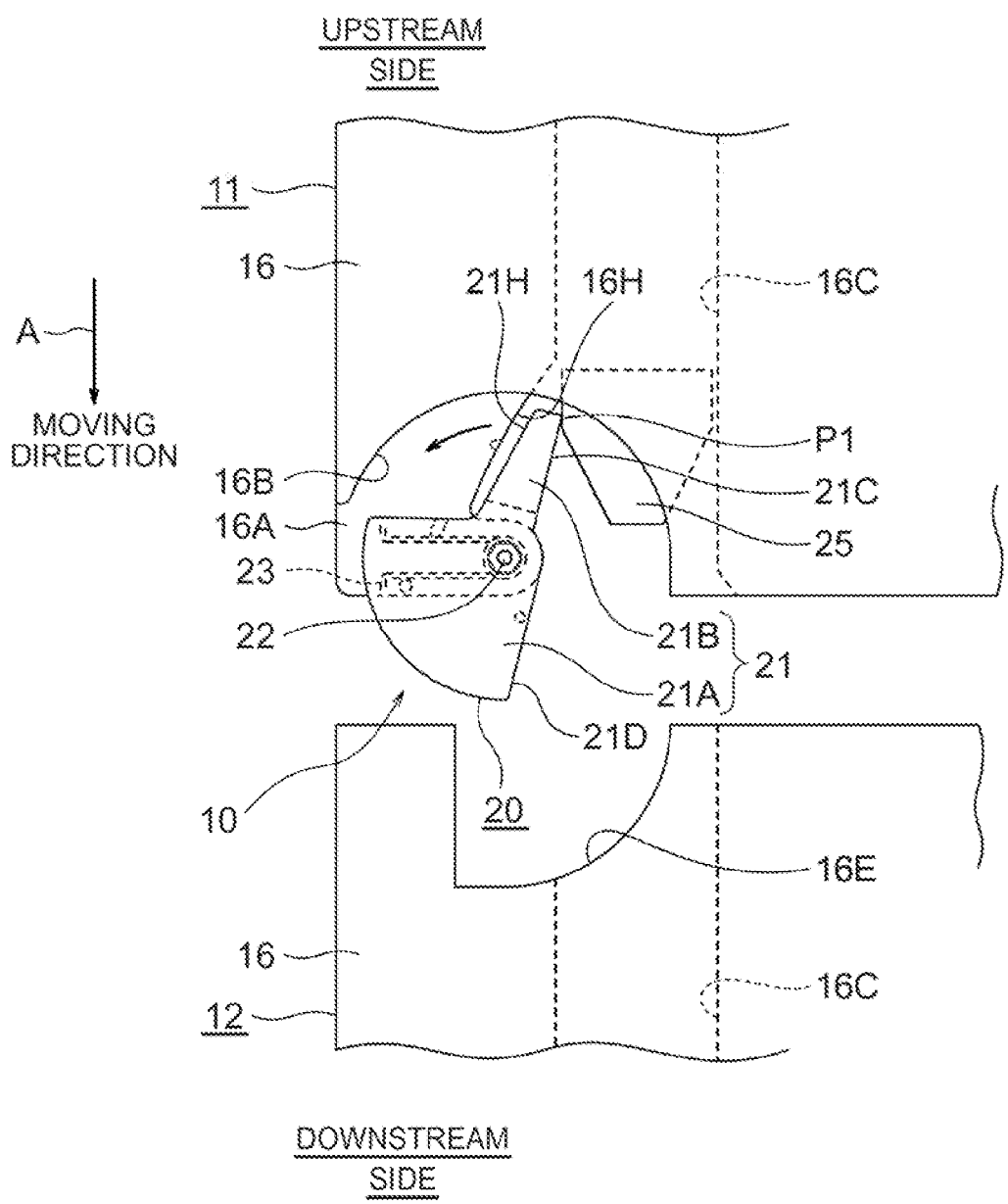
FIG. 16 is a plan view showing a state where the upstream-side moving body further moves from the state of FIG. 15, and the contact between the protrusion member and the rotary pressure member is released.

The rotary body 21 is in contact with the protrusion member 25 at a contact point P1 (see also FIG. 16). However, there is no load generated in the separating device main body 20 since it is avoided by the rotating action, so that the downstream-side moving body 12 can pass over the protrusion member 25.

Further, when the rotating direction of the rotary body 21 is restricted only to the counterclockwise direction, the downstream-side moving body 12 becomes capable of passing over the protrusion member 25 only in the moving direction. When it is tried to move the downstream-side moving body 12 to the direction opposite from the moving direction, the rotary engaging part 21B of the rotary body 21 returns to the original position by the effect of the twist coil spring 23 as described by referring to FIG. 9 and the rotary body 21 itself blocks the notch part 16B. Thus, the protrusion member 25 cannot be avoided by the rotary action of the rotary body 21. Thereby, the downstream-side moving body 12 becomes incapable of passing over the protrusion member 25.

As a result, the separating device main body 20 comes to have a backward movement preventing function which prevents the downstream-side moving body 12 from moving in the reverse direction of the moving direction.

Figure 12:
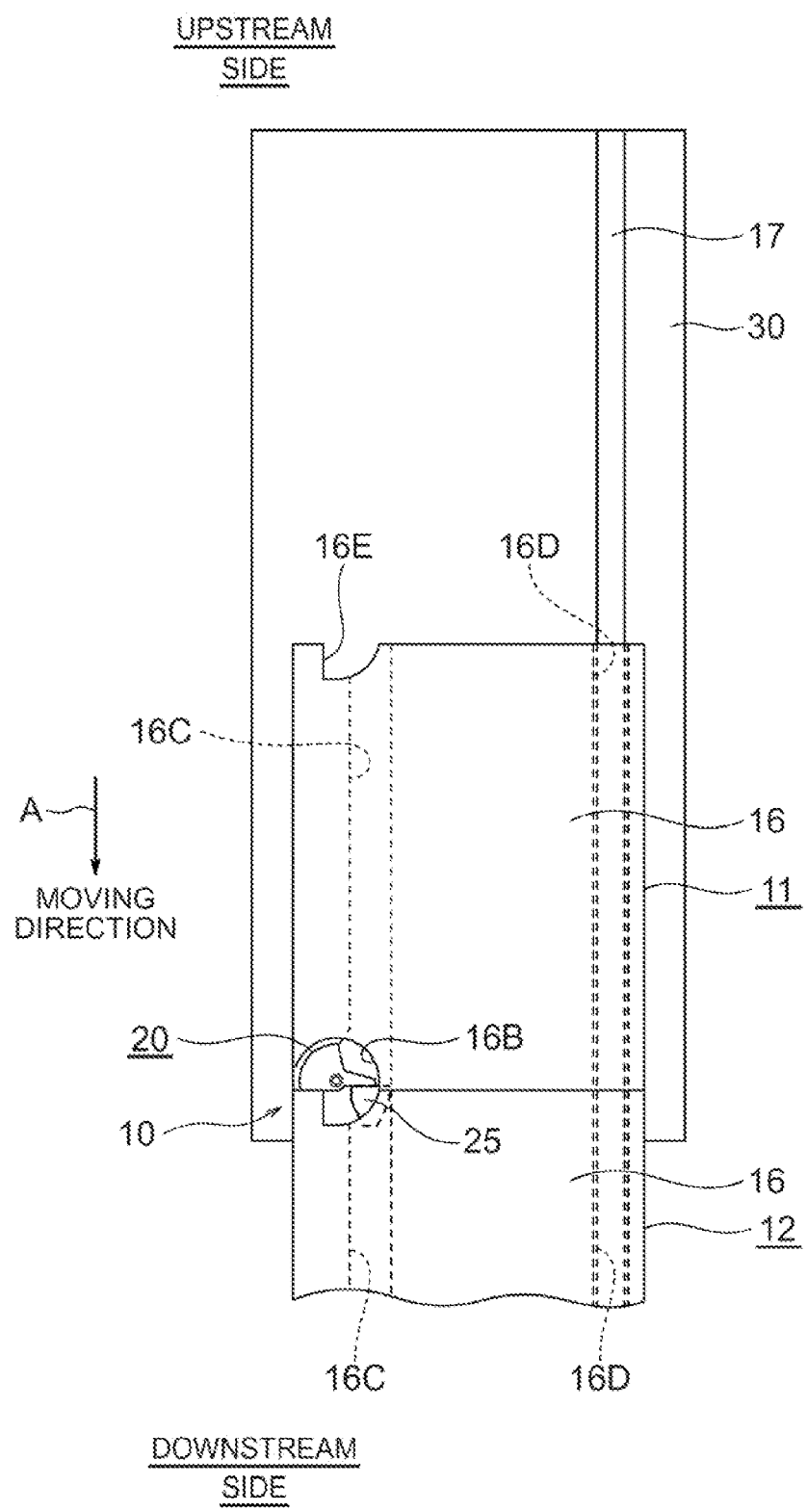
FIG. 12 is a plan view showing a state where the upstream-side moving body and the downstream-side moving body further move from the state of FIG. 11, and the rotary pressure member and the protrusion member of the upstream-side moving body come in contact.

When the upstream-side moving body 11 and the downstream-side moving body 12 move further and the separating device main body 20 of the upstream-side moving body 11 comes to be in contact with the protrusion member 25 as shown in FIG. 12, the downstream-side moving body 12 comes to be in a detachable state.

Figure 14:
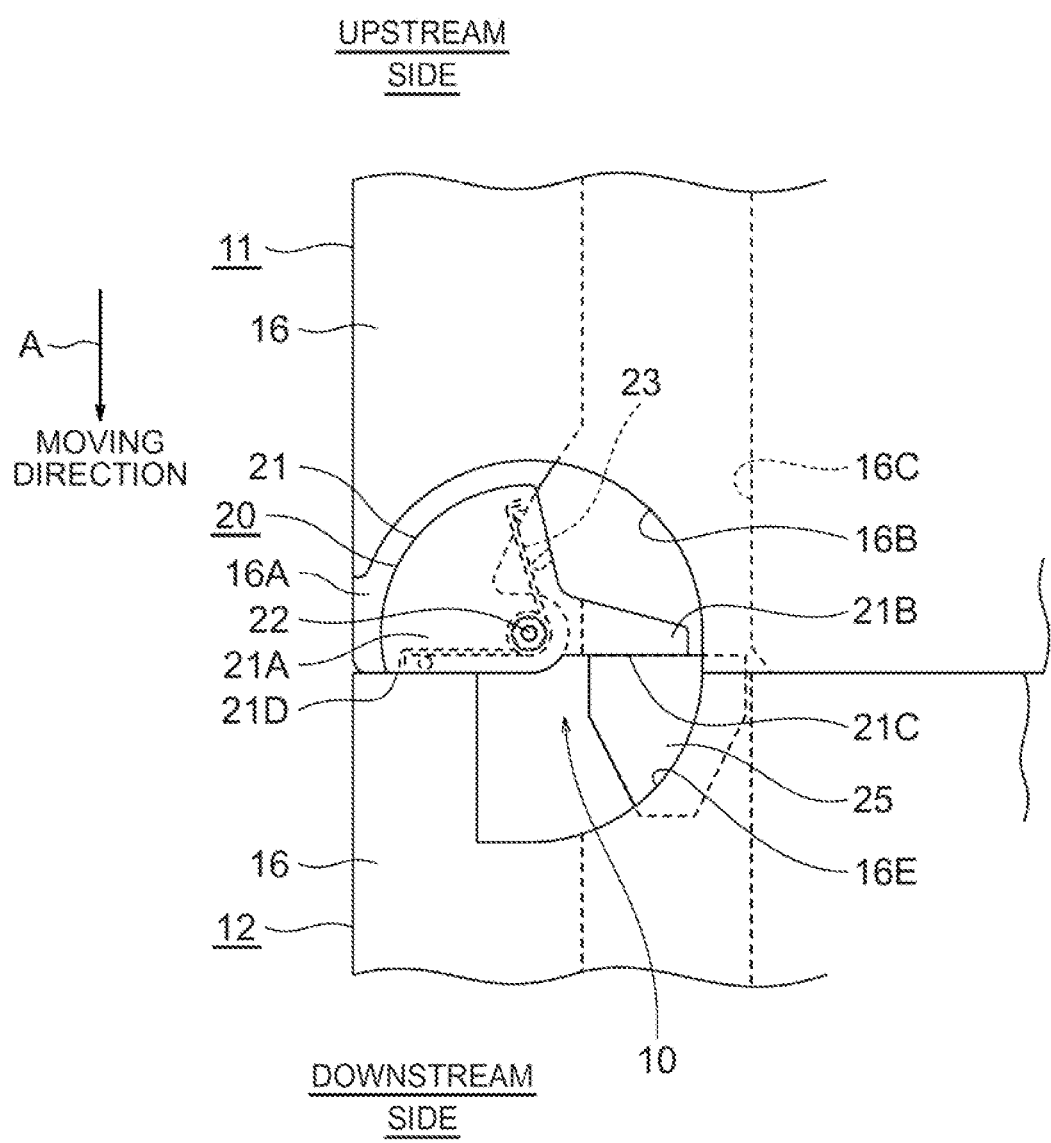
FIG. 14 is a plan view showing the details of the mutual relation regarding the rotary pressure member of the upstream-side moving body, the lower-stream moving body, and the protrusion member of the exemplary embodiment.

At this time, as shown in FIG. 14 in details, the separating device main body 20 is in contact with the protrusion member 25 at the front-side end face 21C of the rotary engaging part 21B. However, when the downstream-side moving body 12 is not completely removed, it is abutted against the bottom plate part 16 of the downstream-side moving body 12 at the front-side end face 21D of the flat part 21A of the rotary body 21. Thus, the rotating action is suppressed.

As a result, the upstream-side moving body 11 cannot rotate by avoiding the protrusion member 25. That is, it is in a locked state, so that the upstream-side moving body 11 is fixed at this position.

However, when a force necessary to release the connection with the upstream-side moving body 11 is applied to the downstream-side moving body 12 in this state, the rotary body 21 rotates and the front-side end face 21D of the flat part 21A presses the rear-end face of the downstream-side moving body 12 as described above. Thus, the downstream-side moving body 12 and the upstream-side moving body 11 are separated. As a result, the downstream-side moving body 12 becomes movable in the moving direction by itself, so that the downstream-side moving body 12 can be detached.

Figure 13:
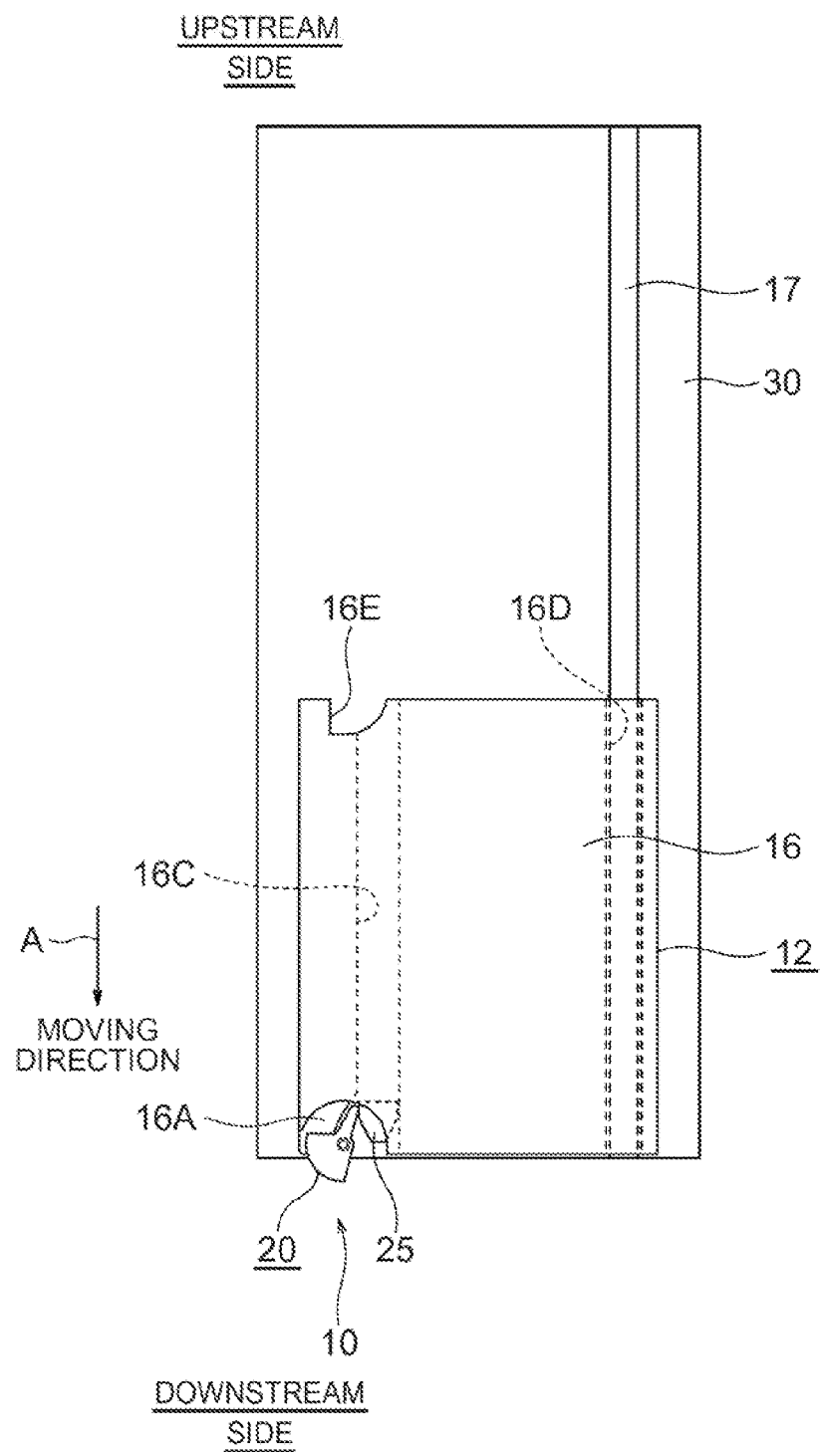
FIG. 13 is a plan view showing a state where the downstream-side moving body is completely detached from the state of FIG. 12.

When the downstream-side moving body 12 is separated, there is nothing that suppresses movements of the separating device main body 20 of the upstream-side moving body 11 as shown in FIG. 13. Thus, the rotary body 21 of the separating device main body 20 can rotate freely. Further, when the upstream-side moving body 11 moves along the moving direction shown by the arrow A, the rotary body 21 of the separating device main body 20 of the upstream-side moving body 11 rotates upon becoming in contact with the protrusion member 25. The rotary body 21 is in contact with the protrusion member 25 at a contact point P1. However, there is no load generated in the separating device main body 20 since it is avoided by the rotating action, so that the upstream-side moving body 11 can pass over the protrusion member 25.

Next, the operation for separating the downstream-side moving body 12 by the separating device man body 20 of the upstream-side moving body 11 will be described in more details by referring to FIG. 14 to FIG. 17.

As shown in FIG. 14, when the upstream-side moving body 11 and the downstream-side moving body 12 in a connected state move to the separating position of the both moving bodies 11 and 12, i.e., move to the position of the protrusion member 25, the front-side end face 21D of the flat part 21A of the rotary body 21 provided to the upstream-side moving body 11 and a part of the rear-end face of the downstream-side moving body 12 are abutted against each other. This state is the same as the state described in FIG. 12.

Figure 15:
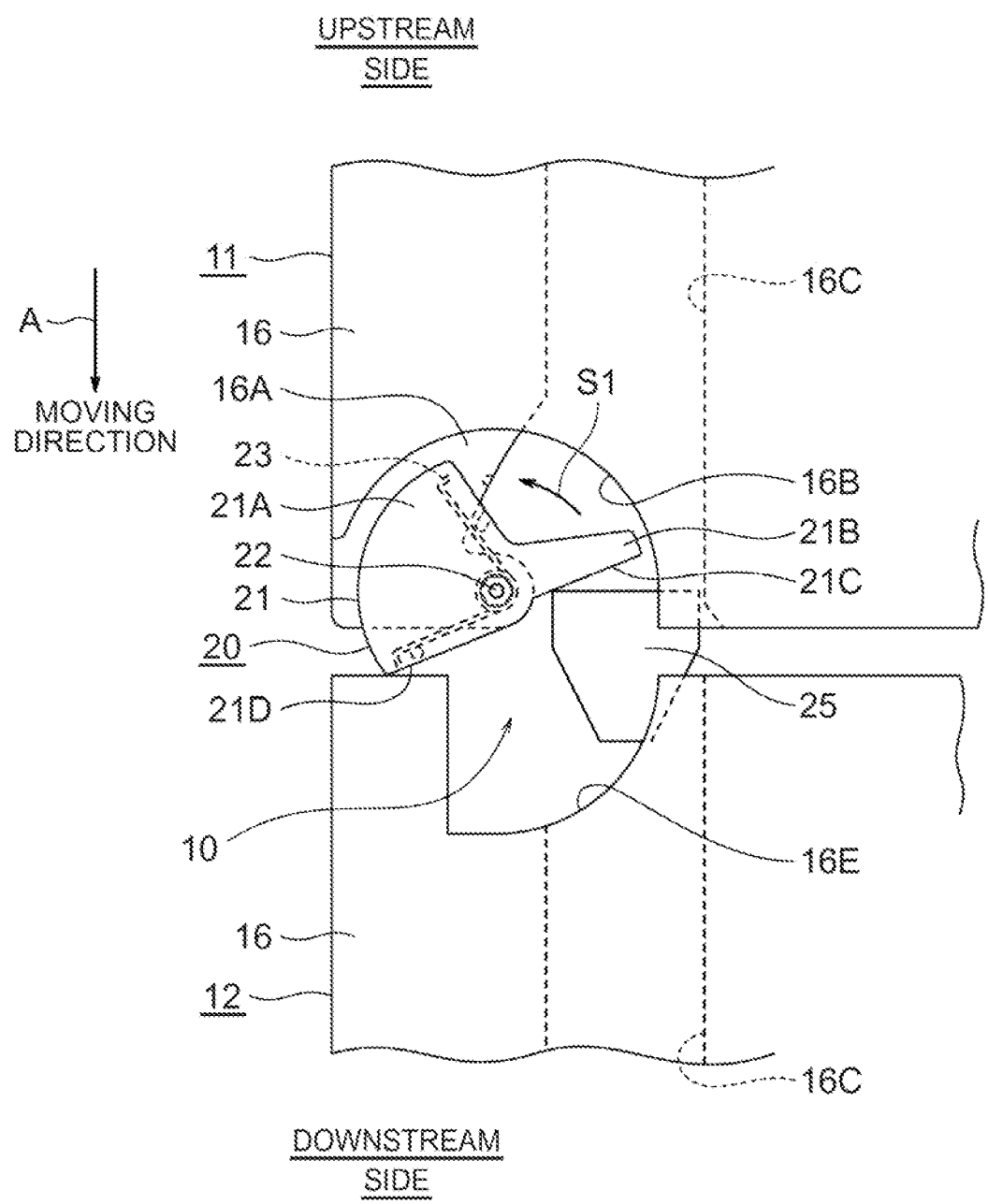
FIG. 15 is a detailed plan view showing a state where the upstream-side moving body moves from the state of FIG. 14, and the rotary pressure member rotates to push out the downstream-side moving body.

When an external force is continuously applied to the downstream-side moving body 12 in the moving direction from the state shown in FIG. 14, the rotary engaging part 21B of the rotary body 21 of the upstream-side moving body 11 is pressed by the protrusion member 25 as shown in FIG. 15. As a result, the rotary engaging part 21B and the flat part 21A rotate by having the supporting shaft 22 as the center.

Then the downstream-side moving body 12 is pressed towards the moving direction to be separated due to the reaction force generated at the flat part 21A of the rotary body 21. As a result, the upstream-side moving body 11 and the downstream-side moving body 12 are separated.

As shown in FIG. 15 in details, the principle of the lever works on the rotary engaging part 21B of the separating device main body 20 with the supporting shaft 22 being the center, so that there is a force for separating the downstream-side moving body 12 generated at the flat part 21A on the opposite side of the rotary engaging part 21B by having the supporting shaft 22 as the center by being pressed by the protrusion member 25. This separating force constitutes a supplementary force that works as a support of the external force applied to the downstream-side moving body 12.

As a result, a force that is the total force of the supplementary force and the external force applied to the downstream-side moving body 12 works on the downstream-side moving body 12. Therefore, it is possible to separate the upstream-side moving body 11 and the downstream-side moving body 12 with a smaller external force than the external force that is originally applied to the downstream-side moving body 12.

The supplementary force generated by the principle of the lever changes in accordance with the distance from the supporting shaft 22 to the protrusion member 25 that is to be the contact point. Thus, a desired supplementary force can be acquired by changing the distance arbitrarily.

Figure 17:
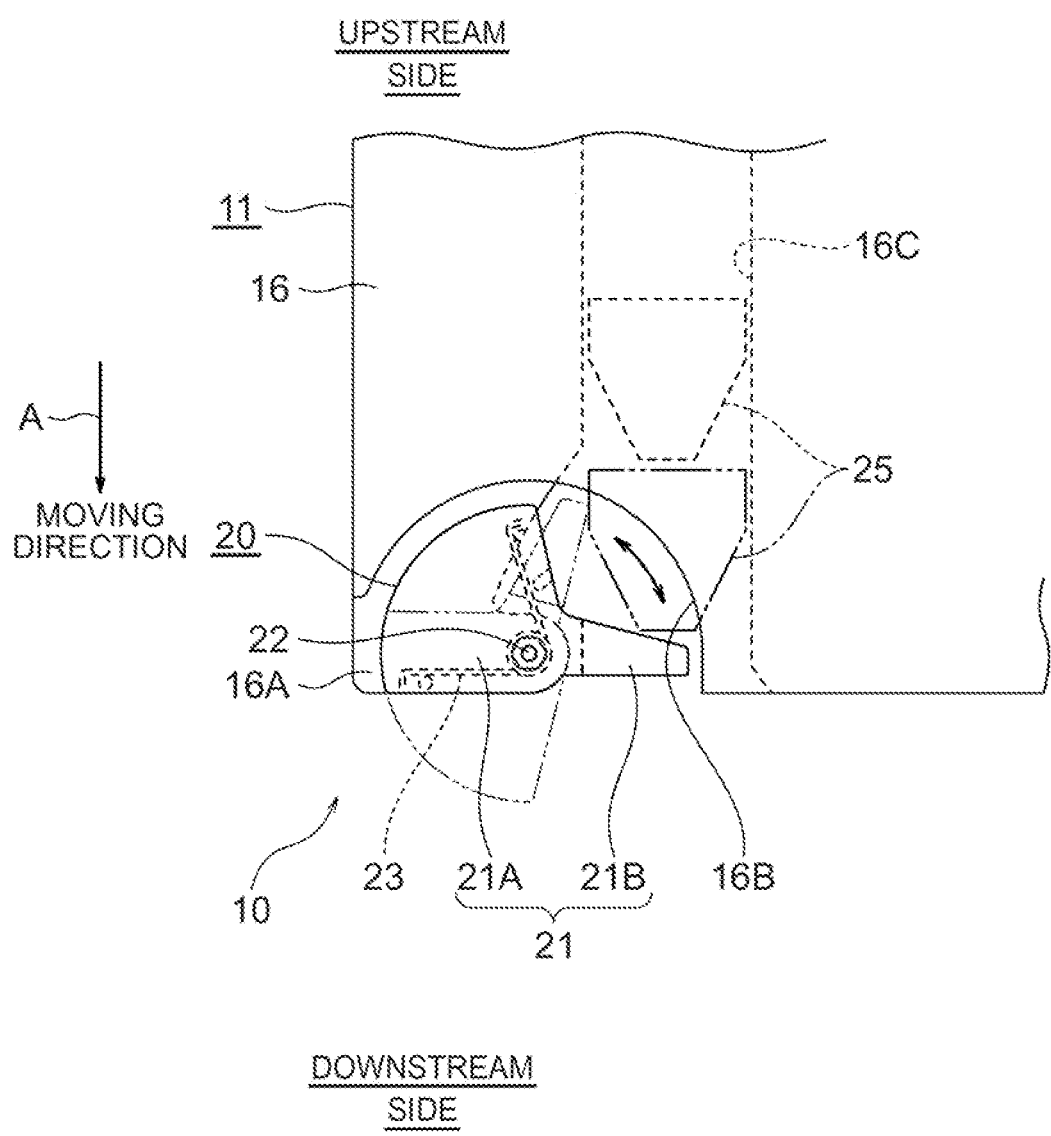
FIG. 17 is a plan view showing a state where the protrusion member passes after the downstream-side moving body is detached from the state of FIG. 16, and the rotary pressure member of the upstream-side moving body returns to the original position.

When the downstream-side moving body 12 is completely separated from the upstream-side moving body 11, the rotary body 21 of the separating device main body 20 of the upstream-side moving body 11 becomes freely rotatable completely as shown in FIG. 16 and FIG. 17. Therefore, through applying an external force to the upstream-side moving body 11 towards the moving direction, it is possible to move the upstream-side moving body 11 and to detach the upstream-side moving body 11 at last.

With the moving body separating device 10 in the structure described above, following effects can be achieved.

(1) When the upstream-side moving body 11 and the downstream-side moving body 12 in a connected state are moved, the rotary body 21 comes in contact with the protrusion member 25 and rotates by being pressed by the protrusion member 25. Thereby, the downstream-side moving body 12 is pushed out towards the downstream side by the front-side end face 21D of the flat part 21A of the rotary body 21. Since the both moving bodies 11 and 12 can be separated by simply moving the upstream-side moving body 11 and the downstream-side moving body 12 in a connected state, separating actions of those can be securely done with a simple operation.

(2) The front-side end face 21C of the rotary engaging part 21B which comes in contact and is pressed by the protrusion member 25 in the rotary body 21 of the separating device main body 20 is provided at a position isolated from the supporting shaft 22 by a prescribed distance, and the front-side end face 21D of the flat part 21A which abuts against the rear-end face of the downstream-side moving body 12 and pushes it out is set on the opposite side of the rotary engaging part 21B with respect to the supporting shaft 22. The pressure force by the protrusion member 25 transmits to the downstream-side moving body 12 because of the principle of the lever. Therefore, it is possible to separate the both moving bodies 11 and 12 with an external force that is smaller than the force required for separating the upstream-side moving body 11 and the downstream-side moving body 12.

(3) When the rotary engaging part 21B of the rotary body 21 abuts against the protrusion member 25 and the upstream-side moving body 11 moves, the rotary engaging part 21B of the rotary body 21 is rotated at about 90 degrees in a counterclockwise direction by opposing to the energizing force of the original-position retuning spring 23. However, after passing the protrusion member 25, the rotary body 21 can be returned to the original position by an effect of the original-position returning spring 23. When the rotary body 21 returns to the original position, the bottom plate part 16 passed over the protrusion member 25 and also the upstream-side moving body 11 and the like cannot return to the direction reversed from the moving direction even though those try to move back since the rotary body 21 blocks the rail guide groove 16D. Therefore, reverse movements of the upstream-side moving body 11 and the like can be prevented by the rotary body 21 of the separating device main body 20.

(4) The original position returning spring 23 is mounted to the supporting shaft 22 while one end part thereof is engaged with one side face of the rotary engaging part 21B of the rotary body 21 and the other end is engaged with the side face of the step part 16A. The side face of the step part 16A is so formed that the rotary body 21 can be rotated at 90 degrees counterclockwise, so that the rotary body 21 can be returned to the original position securely.

(5) The protrusion-member guide groove 16C guided to the protrusion member 25 is formed along the longitudinal direction of each of the moving bodies 11 and 12 on one-side end part in the width direction of the bottom plate parts 16 of the upstream-side moving body II and the downstream-side moving body 12, and the rail guide 16D is formed in a straight form and in parallel to the protrusion-member guide groove 16C on the other-side end part in the width direction of the bottom plate parts 16. Therefore, the upstream-side moving body 11 and the downstream-side moving body 12 can be in a state of being guided by the protrusion member 25 and the rail 17 in a well-balanced manner, so that the moving bodies can be moved in a stable manner.

As an exemplary advantage according to the invention, when the upstream-side moving body and the downstream-side moving body are moved in a connected state, the rotary pressure member comes in contact with the pressure force energizing member and rotates by being pressed by the pressure force energizing member, and the other end part of the rotary pressure member pushes out the downstream-side moving body towards the downstream-side, so that the both moving bodies can be separated by simply moving the upstream-side moving body and the downstream-side moving body in a connected state. Therefore, it is possible with the present invention to separate the moving bodies securely with a simple operation. While the present invention has been described above by referring to each of the exemplary embodiments, the present invention is not limited to each of the exemplary embodiments described above. Various modifications that can be understood by those skilled in the arts can be added to the structures and details of the present invention. Further, the present invention includes mutual and appropriate combinations of a part of or a whole part of the structures of each of the exemplary embodiments.

For example, the connecting module 40 for connecting each of the moving bodies 11 and 12 is provided in one-side end part of the width direction in the respective moving-direction front and end faces of each of the main body parts 15 in the exemplary embodiment. However, the structure thereof is not limited only to such case. The connecting module 40 may be provided in the center part of the width direction. In that case, recessed parts for attaching the first connecting member 41 and the second connecting member 42 of the connecting module 40 may be provided at the end faces of each of the main body parts 15. With this, each of the moving bodies 11 and 12 can be connected uniformly.

Further, while the protrusion-member guide groove 16C is provided on one side of the bottom plate part 16 in the width direction and the rail 17 is provided on the other side of the width direction in the exemplary embodiment, the structure thereof is not limited only to such case. For example, the protrusion member 25 may be provided by corresponding to the center part of the bottom plate part 16 in the width direction, the protrusion-member guide groove 16C may be formed in the bottom plate part 16, and the rail 17 may be provided by corresponding to the rail guide groove 16D formed on both sides of the bottom plate part 16 in the width direction. This makes it possible to press the rear end face of the downstream-side moving body 12 with the rotary body 21 of the upstream-side moving body 11. Therefore, it is possible to separate the moving bodies in a well-balanced manner, and to move each of the moving bodies 11 and 12 in a well-balanced manner as well.

Figure 18:
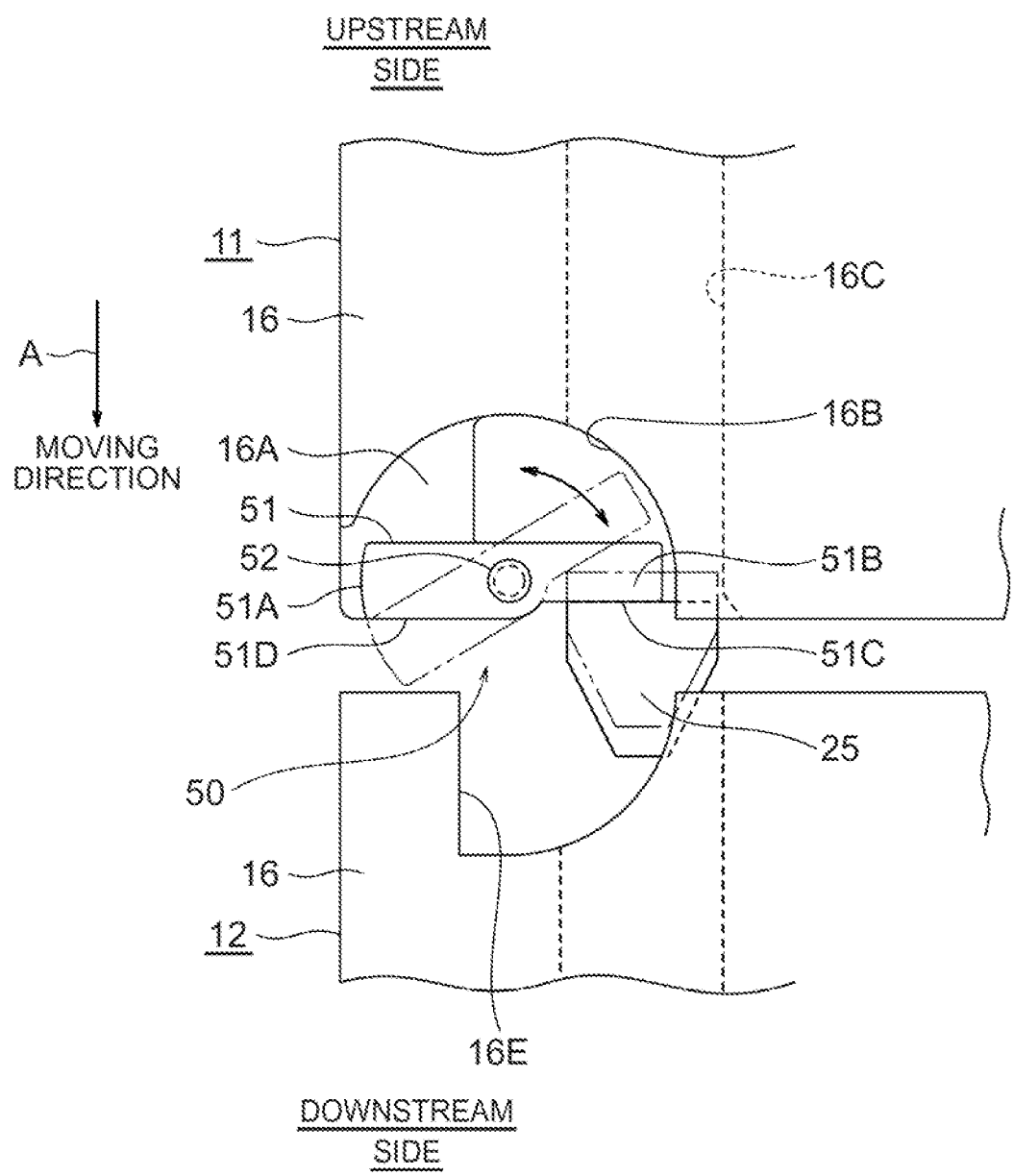
FIG. 18 is a plan view showing a modification embodiment of the rotary pressure member of the present invention.

Further, while the rotary body 21 of the separating device main body 20 is formed to include the fan-shaped flat part 21A and the rotary engaging part 21B, the structure thereof is not limited only to such case. For example, it is also possible to employ a separating device main body 50 that includes a flat-stick type rotary body 51 as shown in FIG. 18. That is, the rotary body 51 is formed as a shape that includes a flat part 51A and a rotary engaging part 51B supported by a supporting shaft 52 to be freely rotatable. Further, a front-side end face 51C of the rotary engaging part 51B comes in contact with the protrusion member 25, and a front-side end face 51D of the flat part 51A is capable of abutting against the rear end face of the downstream-side moving body 12.

With such structure, it is possible to achieve such an effect of (6) that manufacturing of the rotary body 51 and the like can be done easily in addition to achieving the same effects as those described in (1)-(5).

Further, while the protrusion member 25 is formed in a shape of the home plate of baseball in the exemplary embodiment, the shape thereof is not limited only to such case. The protrusion member 25 may be formed by a round-bar type member or a square-bar type member. When those members are used, manufacturing of the protrusion member can be done easily, and a pressing action by the protrusion member 25 can be done at a position distant from the supporting shaft 22. Thus, the effect of the principle of the lever can be acquired more greatly.

The whole or part of the exemplary embodiments disclosed above can be described as, but not limited to, the following supplementary notes:

(Supplementary Note 1)

A moving body separating device characterized to include a separating device main body loaded on an upstream-side moving body disposed to be movable in one direction on a base to function to separate a downstream-side moving body connected to the upstream-side moving body on the base at a prescribed separating point when moving to a downstream side, wherein: the separating device main body includes a rotary pressure member disposed close to the downstream-side moving body to function to push out the downstream-side moving body towards the downstream side by its other end part through a rotary action, a supporting shaft held by the upstream-side moving body for supporting the rotary pressure member to be freely rotatable, and an original-position returning spring held by the supporting shaft for returning the rotary pressure member to an original position; and a pressure force energizing member which generates a rotary pressure force at the rotary pressure member by energizing the rotary pressure member is fixed at the separating point on the base by corresponding to one end part of the rotary pressure member.

(Supplementary Note 2)

The moving body separating device depicted in Supplementary Note 1, wherein: the upstream-side moving body includes a main body part capable of loading goods on its top face and a bottom plate part that supports the main body part; and the rotary pressure member is provided on the bottom plate part.

(Supplementary Note 3)

The moving body separating device depicted in Supplementary Note 2, wherein an energizing-member guide groove formed along a whole length of the upstream-side moving body in a moving direction for guiding the pressure force energizing member is provided on the bottom plate part of the upstream-side moving body.

(Supplementary Note 4)

The moving body separating device depicted in Supplementary Note 3, wherein a rail guide groove guided to a rail that is provided along the moving direction of the moving body is provided along the energizing-member guide groove and on an opposite side of the energizing-member guide groove on the bottom plate part of the upstream-side moving body.

(Supplementary Note 5)

The moving body separating device depicted in Supplementary Note 4, wherein the energizing-member guide groove and the rail guide groove are provided in a straight-line form.

(Supplementary Note 6)

The moving body separating device depicted in any one of Supplementary Notes 2 to 5, wherein: a part of the bottom plate part is formed as a step part that is lower than a top face of the bottom plate part by one step; other end part of the rotary pressure member is disposed on a top face of the step part to be rotatable; the supporting shaft is provided in a side end part of the energizing-member guide groove of the step part, and the original-position returning spring is mounted to the supporting shaft; and one end part of the original-position returning spring is engaged with a side face of the one end of the rotary pressure member, and other end part of the original-position returning spring is engaged with a side face of the step part.

Industrial Applicability

The present invention can be utilized for a housing device such as a drawer of a desk and a safe box or devices having similar functions. Further, the present invention can be utilized for general-purpose serially coupled objects such as trains, vehicles, and containers.

What is claimed is:

1. A moving body separating device, comprising a separating device main body loaded on an upstream-side moving body disposed to be movable in one direction on a base to function to separate a downstream-side moving body connected to the upstream-side moving body on the base at a prescribed separating point when moving to a downstream side, wherein:

the separating device main body comprises a rotary pressure member disposed close to the downstream-side moving body to function to push out the downstream-side moving body towards the downstream side by its other end part through a rotary action, a supporting shaft held by the upstream-side moving body for supporting the rotary pressure member to be freely rotatable, and an original-position returning spring held by the supporting shaft for returning the rotary pressure member to an original position; and a pressure force energizing member which generates a rotary pressure force at the rotary pressure member by energizing the rotary pressure member is fixed at the separating point on the base by corresponding to one end part of the rotary pressure member.

2. The moving body separating device as claimed in claim 1, wherein:

the upstream-side moving body comprises a main body part capable of loading goods on its top face and a bottom plate part that supports the main body part; and the rotary pressure member is provided on the bottom plate part.

3. The moving body separating device as claimed in claim 2, wherein an energizing-member guide groove formed along a whole length of the upstream-side moving body in a moving direction for guiding the pressure force energizing member is provided on the bottom plate part of the upstream-side moving body.

4. The moving body separating device as claimed in claim 3, wherein a rail guide groove guided to a rail that is provided along the moving direction of the moving body is provided along the energizing-member guide groove and on an opposite side of the energizing-member guide groove on the bottom plate part of the upstream-side moving body.

5. The moving body separating device as claimed in claim 4, wherein the energizing-member guide groove and the rail guide groove are provided in a straight-line form.

6. The moving body separating device as claimed in claim 2, wherein:

a part of the bottom plate part is formed as a step part that is lower than a top face of the bottom plate part by one step; other end part of the rotary pressure member is disposed on a top face of the step part to be rotatable; the supporting shaft is provided in a side end part of the energizing-member guide groove of the step part, and the original-position returning spring is mounted to the supporting shaft; and one end part of the original-position returning spring is engaged with a side face of the one end of the rotary pressure member, and other end part of the original-position returning spring is engaged with a side face of the step part.

7. A moving body separating device, comprising a separating device main body loaded on an upstream-side moving body disposed to be movable in one direction on a base to function to separate a downstream-side moving body connected to the upstream-side moving body on the base at a prescribed separating point when moving to a downstream side, wherein:

the separating device main body comprises rotary pressure means disposed close to the downstream-side moving body for pushing out the downstream-side moving body towards the downstream side through a rotary action, a supporting shaft held by the upstream-side moving body for supporting the rotary pressure means to be freely rotatable, and an original-position returning spring held by the supporting shaft for returning the rotary pressure means to an original position; and pressure force energizing means for generating a rotary pressure force at the rotary pressure means by energizing the rotary pressure means is fixed at the separating point on the base.

\* \* \* \* \*